(12) United States Patent
Zhang et al.

(10) Patent No.: US 7,171,056 B2
(45) Date of Patent: Jan. 30, 2007

(54) SYSTEM AND METHOD FOR CONVERTING WHITEBOARD CONTENT INTO AN ELECTRONIC DOCUMENT

(75) Inventors: Zhengyou Zhang, Redmond, WA (US); Li-wei He, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 776 days.

(21) Appl. No.: 10/372,488

(22) Filed: Feb. 22, 2003

(65) Prior Publication Data

US 2004/0165786 A1 Aug. 26, 2004

(51) Int. Cl.
*G06K 9/36* (2006.01)
*G06K 9/40* (2006.01)

(52) U.S. Cl. ........................ 382/276; 382/266
(58) Field of Classification Search ........ 382/274–276, 382/162, 173, 199, 201, 203, 266, 268–269; 347/2; 358/530; 345/326
See application file for complete search history.

(56) References Cited

U.S. PATENT DOCUMENTS

| | | | | |
|---|---|---|---|---|
| 5,790,114 A | * | 8/1998 | Geaghan et al. | 715/763 |
| 6,318,825 B1 | * | 11/2001 | Carau, Sr. | 347/2 |
| 2002/0149808 A1 | * | 10/2002 | Pilu | 358/530 |

* cited by examiner

*Primary Examiner*—Kanjibhai Patel
(74) *Attorney, Agent, or Firm*—Lyon & Harr, LLP; Katrina A. Lyon

(57) ABSTRACT

A system and method of converting the content of a regular whiteboard into an electronic document. This system and method provides an effective, economical and easy to use way to convert whiteboard content as an enhanced and easily editable electronic document though the use of a still or video camera. It uses a series of image processing steps to clip borders, rectify the whiteboard image and correct colors.

52 Claims, 18 Drawing Sheets

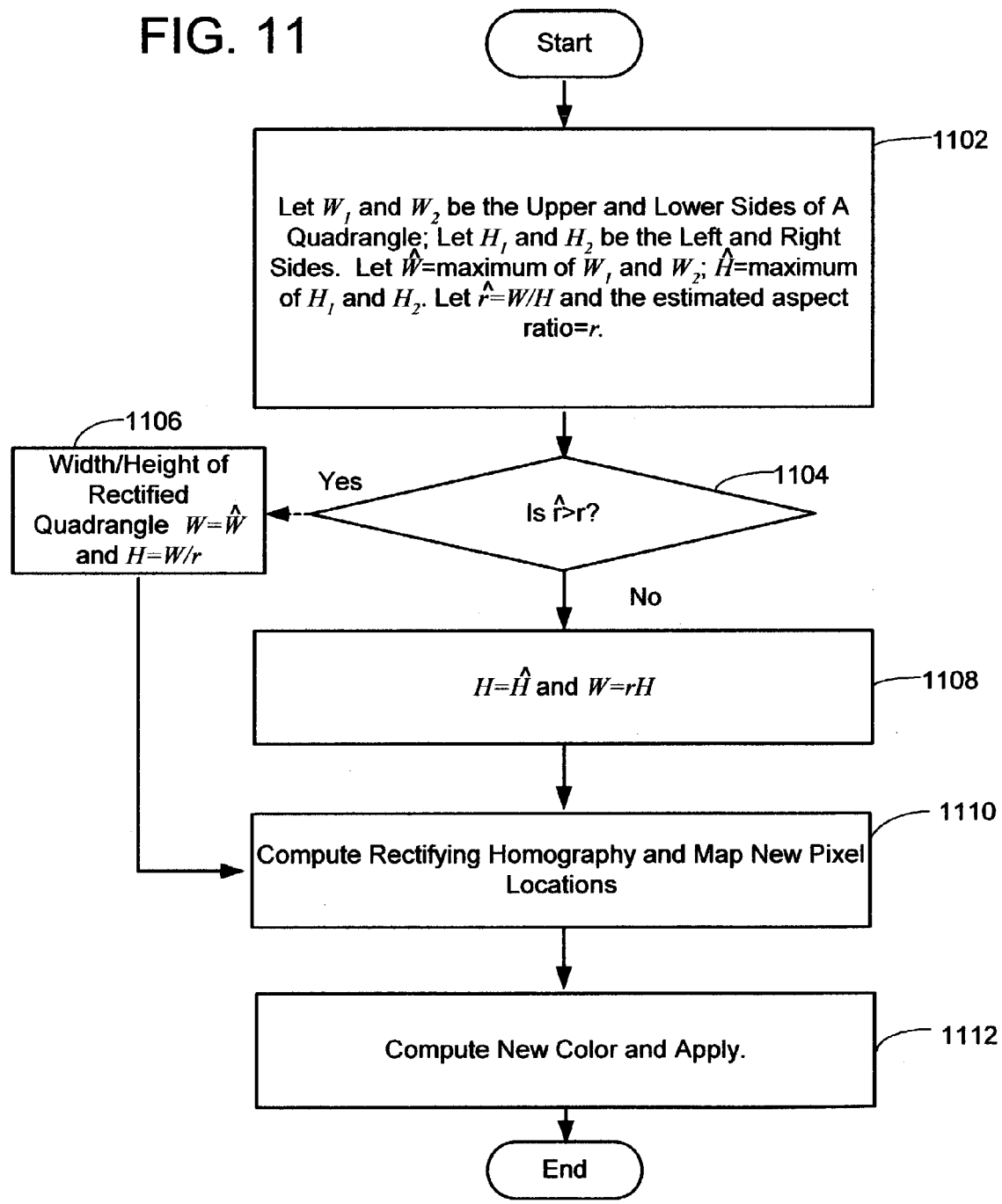

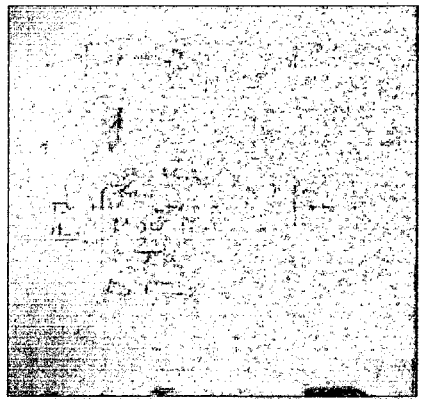
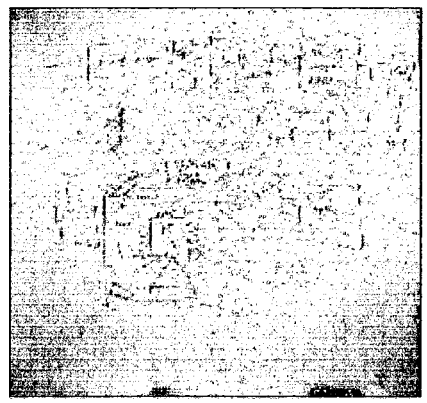
FIG. 12A  FIG. 12B
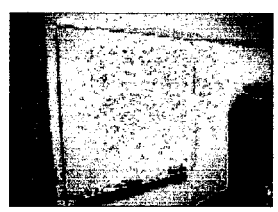
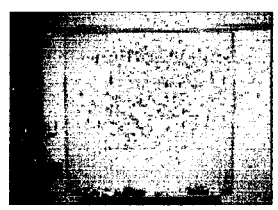
FIG. 13A  FIG. 13B  FIG. 13C
FIG. 13D  FIG. 13E  FIG. 13F

SYSTEM AND METHOD FOR CONVERTING WHITEBOARD CONTENT INTO AN ELECTRONIC DOCUMENT

BACKGROUND

1. Technical Field

This invention is directed toward a system and method for creating editable whiteboard content. More specifically, the invention is directed toward a system and method for converting an image of a whiteboard into an editable electronic document.

2. Background Art

Meetings constitute a large part of many workers' working time. Making more efficient use of this time spent in meetings translates into a big increase in productivity.

Many meeting scenarios use a whiteboard extensively for brainstorming sessions, lectures, project planning meetings, patent disclosures, and so on. Note-taking and copying what is written on the board often interferes with many participants' active contribution and involvement during these meetings. As a result, some efforts have been undertaken to capture whiteboard content in some automated fashion.

Several technologies have been developed to capture the whiteboard content automatically. One of the earliest, the whiteboard copier, is a special electronic whiteboard with a built-in copier. With a click of a button, the whiteboard content is scanned and printed. Once the whiteboard content is on paper, it can be photocopied, faxed, put away in the file cabinet, or scanned into digital form.

More recent technologies attempt to capture the whiteboard content in digital form from the start. They generally fall into two categories—those that capture images of the whiteboard and those that track pen location and infer whiteboard content therefrom.

The devices in the first category capture images of the whiteboard directly. National Television System Committee (NTSC)-resolution video cameras are often used because of their low cost. Since these cameras usually do not have enough resolution to clearly capture what is written on a typical conference room size whiteboard, several video frames must be stitched together to create a single whiteboard image. Another device in this first category is the digital still camera. As high-resolution digital cameras get cheaper, taking snapshots of the board with a digital camera may become a popular choice. However, photographs of a whiteboard are often difficult to read because of light reflections and skewed camera angles relative to the whiteboard. Additionally, such snapshots are not editable in typical office productivity software such as word processors, databases, drawing programs and the like.

Devices in the second category track the location of the pen used to write on the whiteboard at high frequency and infer the content of the whiteboard from the history of the pen coordinates. Sometimes they include an add-on device attached to the side of a conventional whiteboard and use special cases for the dry-ink pens and eraser. Each pen emits ultrasonic pulses when pressed against the board. Two receivers at the add-on device use the difference in time-of-arrival of the audio pulses to triangulate the pen coordinates. Since the history of the pen coordinates is captured, the content on the whiteboard at any given moment can be reconstructed later. The user of this type of whiteboard recording can play back the whiteboard content like a movie. Because the content is captured in vector form, it can be transmitted and archived with low bandwidth and small storage requirements.

Electronic whiteboards also use pen tracking technology. They go one step further than the systems using the previously discussed add-on devices by making the whiteboard an interactive device. The user writes on a monitor with a special stylus that is tracked by the computer. The computer renders the strokes on the screen wherever the stylus touches the screen—as if the ink is deposited by the stylus. Because the strokes are computer generated, they can be edited, re-flowed, and animated. The user can also issue gesture commands to the computer and show other computer applications on the same screen.

Electronic whiteboards, however, currently still have limited installation base due to their high cost and small sizes (the size of an electronic whiteboard rarely exceeds 6 feet in diagonal). Furthermore, systems with pen-tracking devices have the following disadvantages: 1) If the system is not on or the user writes without using the special pens, the content cannot be recovered by the device; 2) Many people like to use their fingers to correct small mistakes on the whiteboard instead of the special eraser. This common behavior causes extra strokes to appear on the captured content; 3) People have to use special dry-ink pen adapters, which make them much thicker and harder to press, for some of the devices; and 4) Imprecision of pen tracking sometimes causes misregistration of adjacent pen strokes.

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The invention is directed toward a system and method of converting the content of a regular whiteboard into an electronic document. This system and method provides an effective, economical and user-friendly way to convert an image of whiteboard content to an enhanced and easily editable electronic document though the use of a camera. It uses a series of image processing process actions to do such things as clip borders, rectify the whiteboard image and correct colors for improved legibility.

The system and method of the invention starts by acquiring an image of a whiteboard or similar planar object (e.g., poster) with an analog or digital camera. The image could be acquired with a still camera or a video camera. If the image is captured with an analog camera it should be digitized prior to further processing. Although the system and method of the invention could be used with any planar object the following paragraphs will describe the invention in terms of converting an image of a whiteboard to an electronic document.

The whiteboard is first located in the image. In one embodiment of the invention, this is done by detecting four strong edges corresponding to the whiteboard edges. The whiteboard usually appears to be a general quadrangle, rather than a rectangle, in an image because of the camera's perspective projection. If a whiteboard does not have strong enough edges, an interface is provided for a user to manually localize the quadrangle. Alternate conventional ways of detecting whiteboard boundaries in the image may also be used.

The system then estimates the actual aspect ratio of the whiteboard from the quadrangle located in the image. Besides the aspect ratio, the focal length of the camera can also be estimated.

Once the aspect ratio is obtained, the image is rectified. From the estimated aspect ratio, and by choosing the "largest" whiteboard pixel as the standard pixel in the final image, the desired resolution of the final image can be computed. A planar mapping (in one embodiment a 3×3 homography matrix) is then computed from the original image quadrangle to the final image rectangle, and the whiteboard image is rectified accordingly.

The background color of the whiteboard is white balanced. This involves two procedures. The first is the estimation of the background color (the whiteboard color under the same lighting without anything written on it). This is not a trivial task because of the complex lighting environment, whiteboard reflection and the quality of strokes written on the whiteboard. The second procedure concerns the actual white-balancing. In the white-balancing process, the background is made uniformly white. Additionally, the color saturation of the pen strokes is increased. The output of the system and method according to the invention is a crisp legible image that ready to be integrated with any other electronic document.

This output is then ready to be vectorized using image vectorization procedures. Image vectorization transforms a bitmap image into vector drawings such as freeform curves, lines and arcs. Tablet PC inks use a vector representation, and therefore a whiteboard image after vectorization can be exported into a Tablet PC. Microsoft's® Tablet PC is a design for a fully-equipped personal computer that allows a user to take notes using natural handwriting on a stylus or digital pen-sensitive touch screen instead of requiring the use of a keyboard.

The system and method according to the invention has many advantages. For instance, it is very easy and inexpensive to obtain editable images and text using a simple image of a conventional whiteboard with regular dry ink marker markings. No expensive electronic whiteboard or tracking system is required. Furthermore, the vectorized form of the whiteboard content is more useful for handwriting recognition and can more efficiently be compressed. Additionally, the contents of the whiteboard formatted in vectorized form is efficient to transmit since it requires little bandwidth.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the invention will become better understood with regard to the following description, appended claims, and accompanying drawings where:

FIG. 11 depicts a flow diagram showing quadrangle rectification according to the system and method of the invention.

FIG. 12 shows the rectified version of the first two images shown in FIG. 8, using estimated aspect ratio. They correspond to FIG. 13A and FIG. 13B. The rectified images look almost identical despite that the original images were taken from quite different angles. Other rectified images are also similar, and are thus not shown.

FIGS. 13A–13F depict six images of the same whiteboard taken from different angles.

FIG. 16A is an original image together with the detected corners shown in small white squares. FIG. 16B shows and edge image. FIG. 16C is a Hough image with $\rho$ in horizontal axis and $\theta$ in vertical axis. FIG. 16D is a cropped and rectified whiteboard image.

FIG. 17A is the original image together with the detected corners shown in small red dots (note that the upper right corner is outside of the image); FIG. 17B is an edge image. FIG. 17C is a Hough image with $\rho$ in the horizontal axis and $\theta$ in the vertical axis. FIG. 17D is a cropped and rectified whiteboard image according to the system and method of the invention.

FIG. 18A is an original image together with the detected corners shown in small red dots. FIG. 18B is an edge image. FIG. 18C is a Hough image with $\rho$ in horizontal axis and $\theta$ in vertical axis. FIG. 18D is a cropped and rectified whiteboard image.

FIG. 20A shows the original image of the poster. FIG. 20B shows the transformed image of the poster using the system and method according to the invention.

FIG. 21A is taken from the front. FIG. 21B is taken from the side. The aspect ratio estimated from both images is very close to ground truth. The estimated aspect ratio for FIG. 21A is 1.06 and for FIG. 21B the aspect ratio is 1.056. The manually measured aspect ratio is 1.05 (the whiteboard size is 42" by 40". The estimated focal length is 842 pixels for FIG. 21A and 781 for FIG. 21B. FIG. 21B was taken with a small zoom out.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
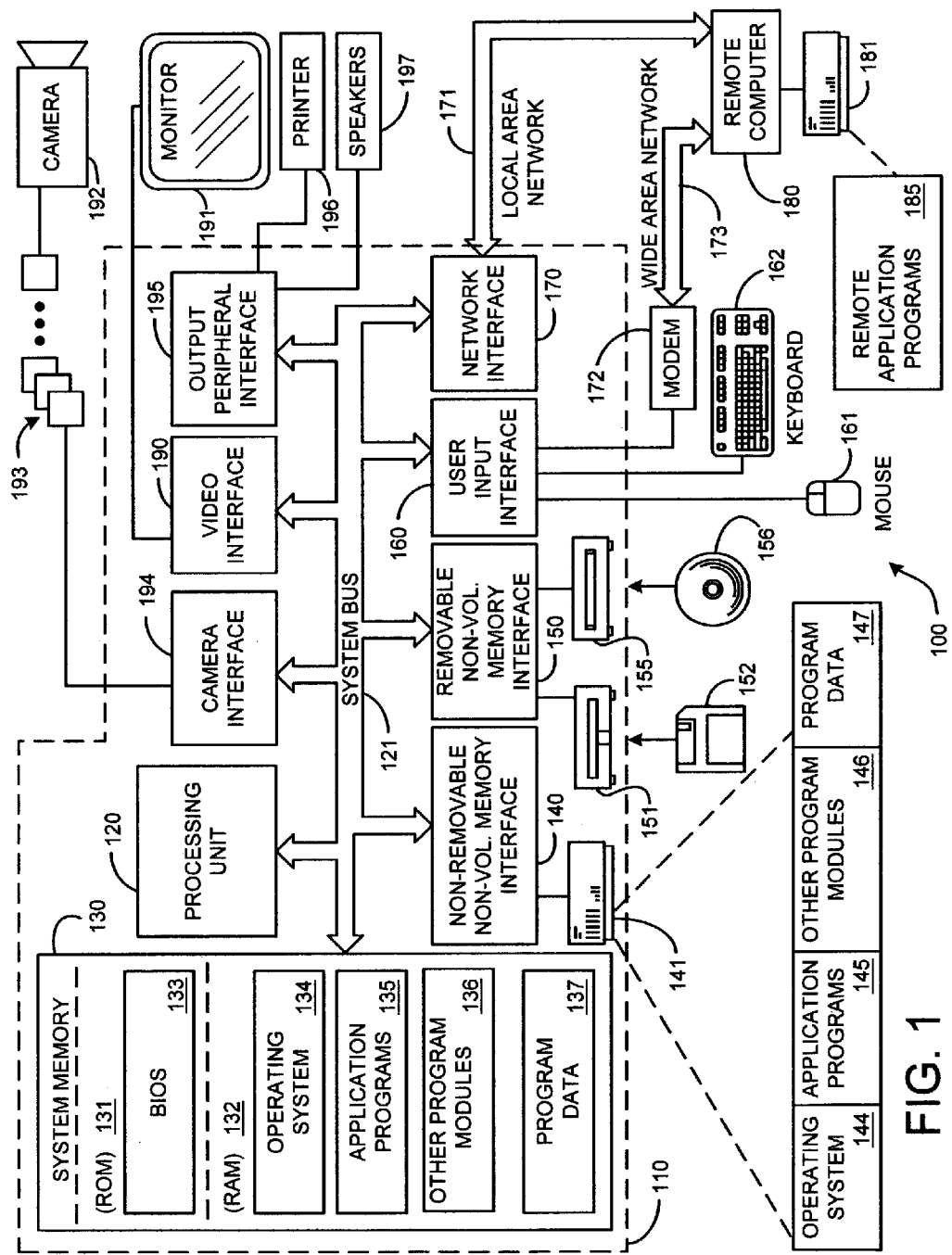
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anonremovable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 System and Method for Converting Whiteboard Content into an Electronic Document 2.1 General Overview.

Figure 2:
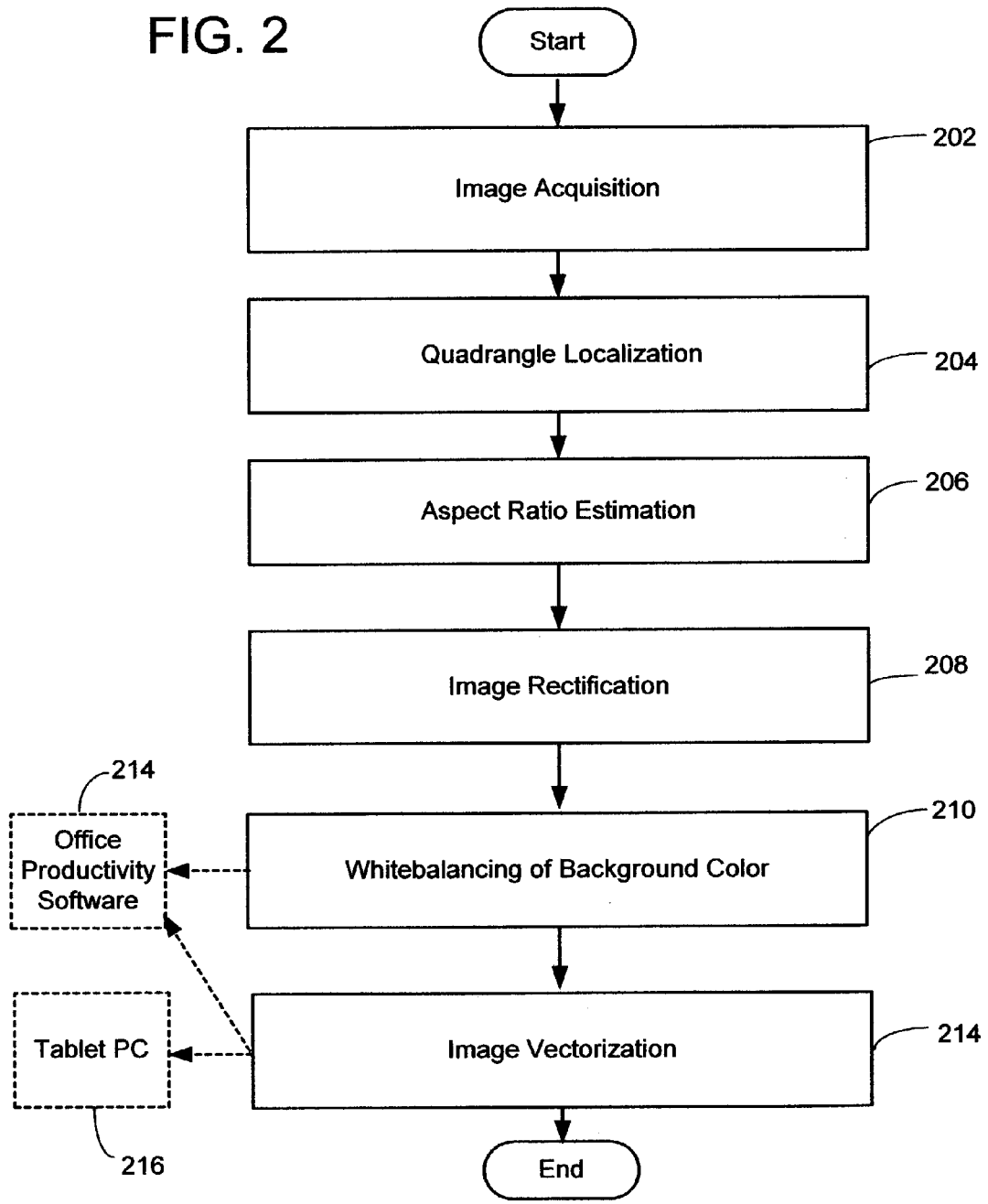
FIG. 2 is a general flow diagram of the system and method according to the invention.

As mentioned previously, the invention converts the content of a regular whiteboard into an electronic document that can be manipulated with office productivity software or exported into a Tablet PC or similar device. As shown in FIG. 2, process actions 202 and 204, the system and method of the invention starts by acquiring an image of a whiteboard and locating the whiteboard in the image. If the image is not captured with a digital still or video camera, the image should be digitized before further processing. In one embodiment of the invention, the boundaries of the whiteboard are located by detecting four strong edges. The whiteboard usually appears to be a general quadrangle rather than a rectangle in the image because of the camera's perspective projection.

If the whiteboard does not have strong enough edges, an interface can be provided for a user to manually identify the quadrangle formed by the whiteboard edges.

Once the whiteboard has been localized, the system and method according to the invention then estimates the actual aspect ratio of the whiteboard from the quadrangle in the image (process action 206 ). Besides the aspect ratio, the focal length of the camera can also be estimated.

The image is then rectified (process action 208). From the estimated aspect ratio, and by choosing the "largest" whiteboard pixel as the standard pixel in the final image, the desired resolution of the final image can be computed. A planar mapping (in one embodiment using a 3×3 homography matrix) is then computed from the original image quadrangle to the final image rectangle, and the whiteboard image is rectified accordingly.

The background color of the whiteboard is also white balanced, as shown in process action 210). This involves two procedures. The first is the estimation of the background color (the whiteboard color under perfect lighting without anything written on it). The second procedure concerns the actual white-balancing. The background is made uniformly white and the color saturation of the pen strokes is increased. The output of the system and method according to the invention is then a crisp image or document ready to be integrated with any office productivity software (process action 212).

This output is then ready to be vectorized using image vectorization procedures (process action 214). Image vectorization transforms a bitmap image into vector drawings such as freeform curves, lines and arcs. Tablet PC inks use a vector representation, and therefore a whiteboard image after vectorization can be exported into a Tablet PC or to the office productivity software for use in, for example, handwriting recognition.

The general system and method according to the invention having been described, the next paragraphs provide details of the aforementioned process actions.

2.2 Automatic Whiteboard Detection.

Figure 3:
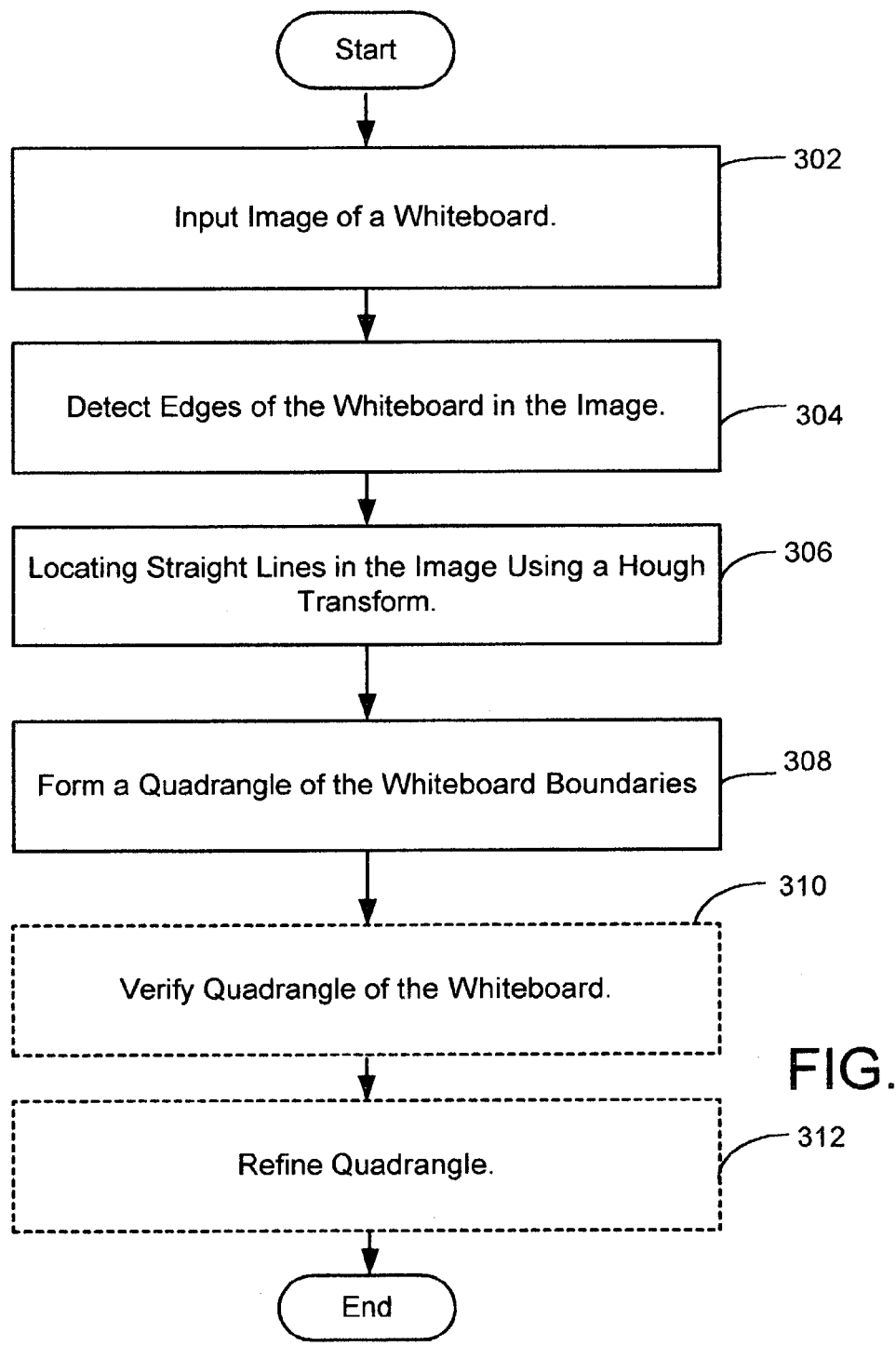
FIG. 3 is a flow diagram depicting the process of automatically detecting a whiteboard in an image according to the system and method of the invention.

To realize the full potential of digital technologies, the system automatically detects the whiteboard within the image. In general, in the embodiment as shown in FIG. 3, this process involves edge detection of objects in the input image (process actions 302 and 304). Then straight lines are located in the image using the Hough transform (process action 306). A quadrangle encompassing the whiteboard is formed (process action 308) and optionally verified (process action 310). Then the quadrangle is optionally refined (process action 312). The details of how the whiteboard boundaries are automatically detected and used to form a quadrangle are described in detail in the following paragraphs.

2.2.1 Edge Detection

Figure 4:
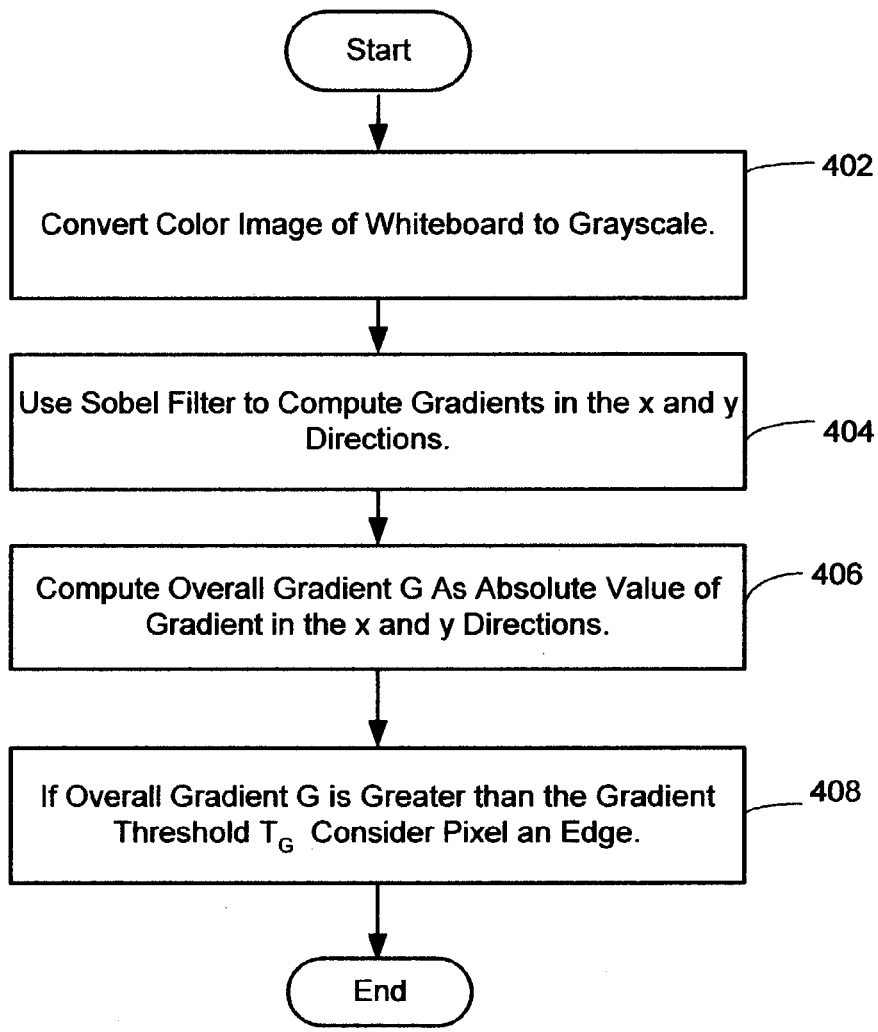
FIG. 4 is a flow diagram depicting the edge detection process according to the system and method according to the invention.

There are many operators for edge detection that are known in the art [1, 2, 3]. The general concept behind edge detection is that the largest changes in pixel intensity in an image define the edge of an object. Typically a threshold is used to decide on a pixel-by-pixel basis whether the change in intensity is sufficient to constitute an edge. In the implementation of one embodiment of the invention, the process actions of which are shown in FIG. 4, the color image of the whiteboard is first converted into a gray level image (process action 402). Then, as shown in process action 404, a Sobel filter is used to compute the gradient in the x and y directions with the masks shown below:

$$G_x = \begin{bmatrix} -1 & -2 & -1 \\ 0 & 0 & 0 \\ 1 & 2 & 1 \end{bmatrix} \quad G_y = \begin{bmatrix} -1 & 0 & 1 \\ -2 & 0 & 2 \\ -1 & 0 & 1 \end{bmatrix}$$

The overall gradient is then computed by absolute values $G=|G_x|+|G_y|$, as indicated in process action 406. If the gradient G is greater than the gradient threshold $T_G$, that pixel is considered as an edge of an object (process action 408). $T_G=40$ in a tested embodiment of the invention. The edge detection masks exaggerate the difference of the edges along their respective directions.

If the automatic edge detection process cannot identify any strong or pronounced edges, an interface can be provided to allow a user to localize a quadrangle encompassing the whiteboard in the image. In one embodiment this interface allows the user to select the four corners of the whiteboard in the image, which is displayed on a computer screen or the like, by using a mouse cursor or similar device.

2.2.2 Hough Transform

Figure 5:
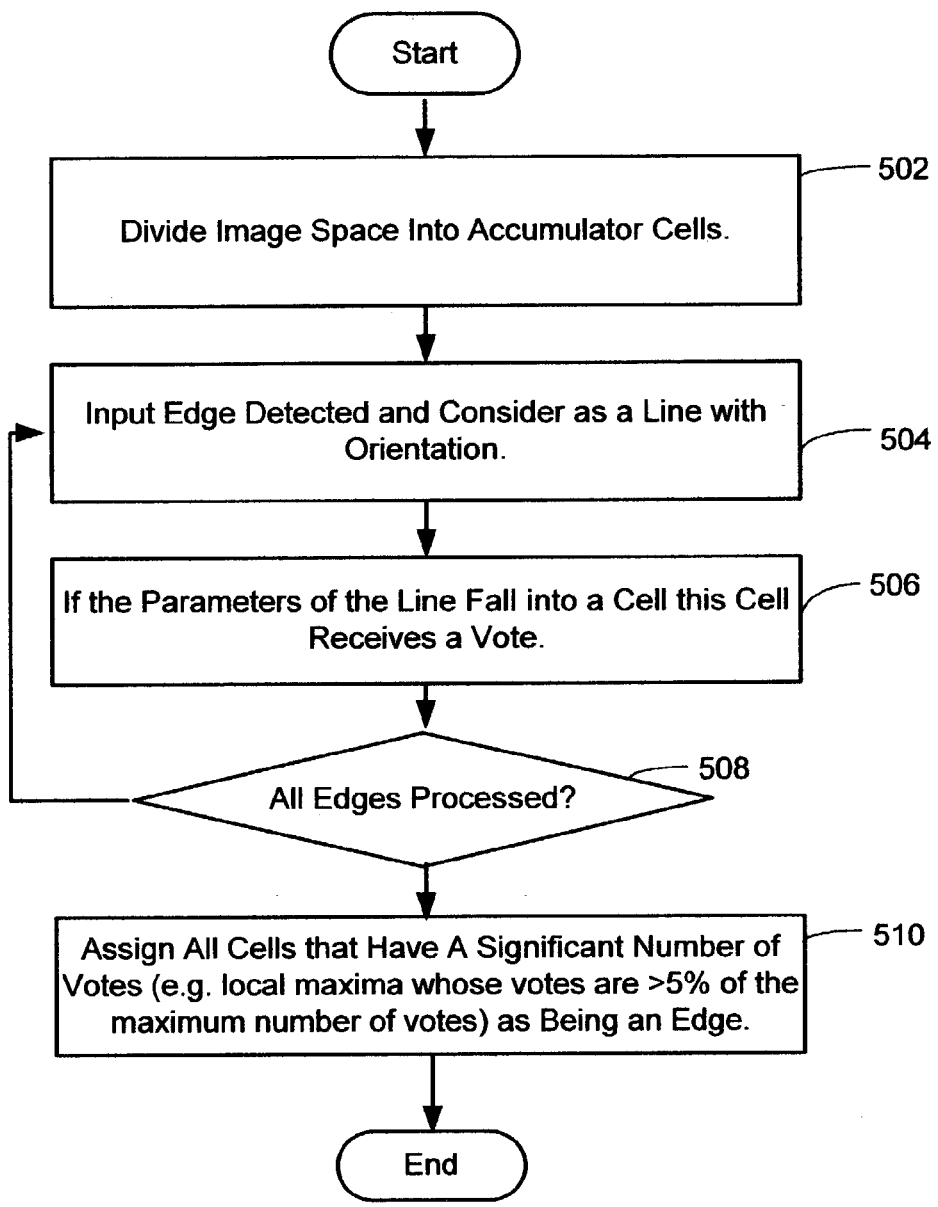
FIG. 5 is a flow diagram depicting the process of using a Hough transform to identify straight lines in the image in the system and method according to the invention.

The Hough Transform is a conventional robust technique to detect straight lines. As shown in FIG. 5, process action 502, the image space is subdivided into accumulator cells. An edge detected in the edge detection process has an orientation, and is considered as a line (process action 504). The orientation of the line is determined using the equations below. If the parameters of the line fall into a cell, that cell receives a vote (process action 506). Once all of the lines have been processed, the cells that receive a significant number of votes represent cells that have strong edge support in the image, as shown in process action 508. This implementation differs from previous uses of the Hough transform in that this system and method detects oriented lines. The orientation information is useful in a later stage for forming a reasonable quadrangle, and is also useful to establish two lines nearby but with the opposite orientation. The latter is important because one usually sees two lines around the border, and if one does not distinguish them, the detected line is not very accurate. The normal representation of a line is used:

$$x_0 \cos \theta + y_0 \sin \theta = \rho$$

The range of angle $\theta$ is $[-180°, 180°]$. For a given edge at $(x_0, y_0)$, its orientation is computed by $\theta = a \tan 2 (G_y, G_x)$ and its distance $\rho = x_0 \cos \theta + y_0 \sin \theta$. In one embodiment of the invention, the size of each cell in the $\rho\theta$-plane is 5 pixels by 2°. In one embodiment all reasonable lines are detected by locating local maxima whose votes are larger than five percent of the maximum number of votes in the Hough space.

Although the Hough transform is used in this embodiment one could use line-fitting or other conventional techniques to determine the straight lines within the image space.

2.2.3 Quadrangle Formation

As discussed above, the votes of the accumulator cells are first examined for high concentrations and all reasonable lines are detected. The procedure for forming the lines basically identifies clusters of bright spots in the Hough image and is simplified as follows:

1) The Hough image is scanned pixel by pixel to find the pixel with the highest value;
2) The corresponding line is recorded;
3) The pixel and the neighboring pixels (within N pixels) are set to zero and step 1 is repeated until all of the pixel values found to be below a pre-specified threshold are identified and are set as belonging to a given line.

Figure 6:
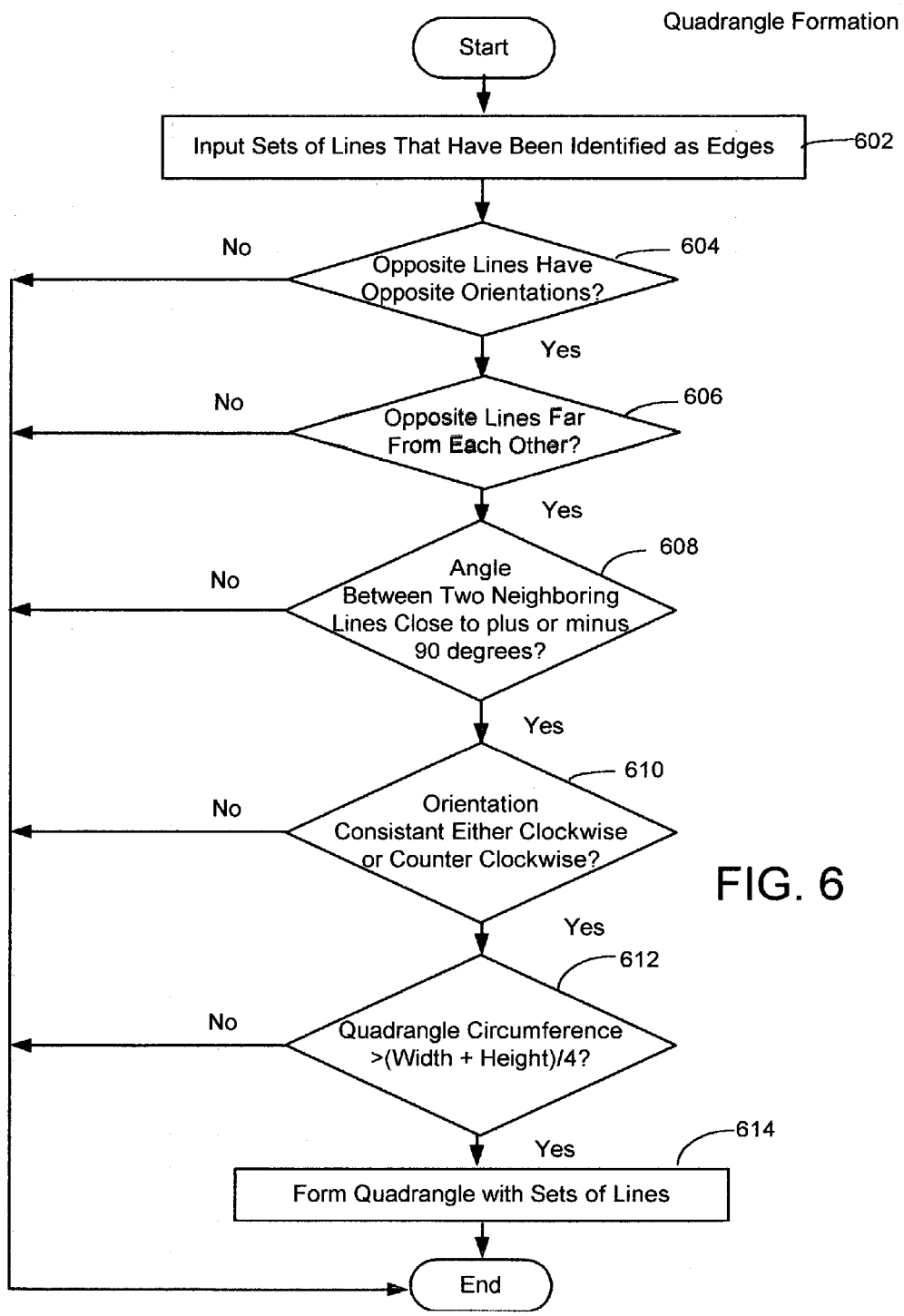
FIG. 6 is a flow diagram depicting the process of forming a quadrangle encompassing the whiteboard in the system and method according to the invention.

Next, as shown in FIG. 6, quadrangles are formed with these lines. The lines detected are input for processing (process action 602). Any four lines could form a quadrangle, but the total number of quadrangles that could be considered may be prohibitively high. In order to reduce the number, the possible quadrangles are tested for certain conditions and only quadrangles that satisfy the following conditions are retained (process actions 604 through 614):

The opposite lines should have quite opposite orientations (in one working embodiment, 180° within 30°).

The opposite lines should be quite far from each other (in one working embodiment, the difference in $\rho$ is bigger than one fifth image of the image width or height).

The angle between two neighboring lines should be close to ±90° (in one working embodiment, within 30°).

The orientation of the line segments of the quadrangle should be consistent (either clockwise or counter-clockwise).

The quadrangle should be big enough (in one working embodiment the circumference was larger than ((W+H)/4)) of the input image dimensions.

The last condition is based on the expectation that a user tries to take an image of the whiteboard as big as possible.

2.2.4 Quadrangle Verification

Figure 7:
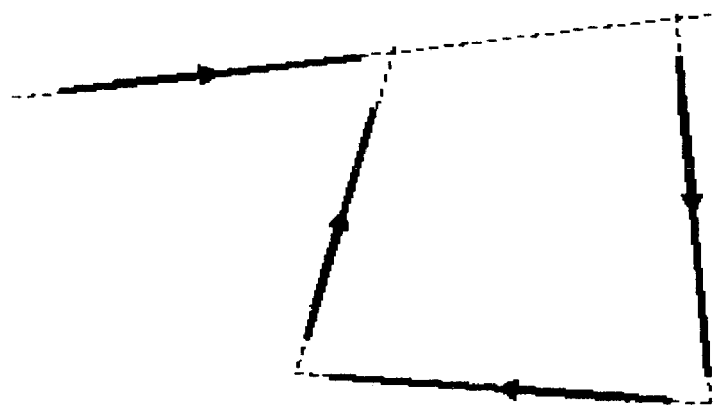
FIG. 7 is an example of a bad quadrangle.
Figure 8:
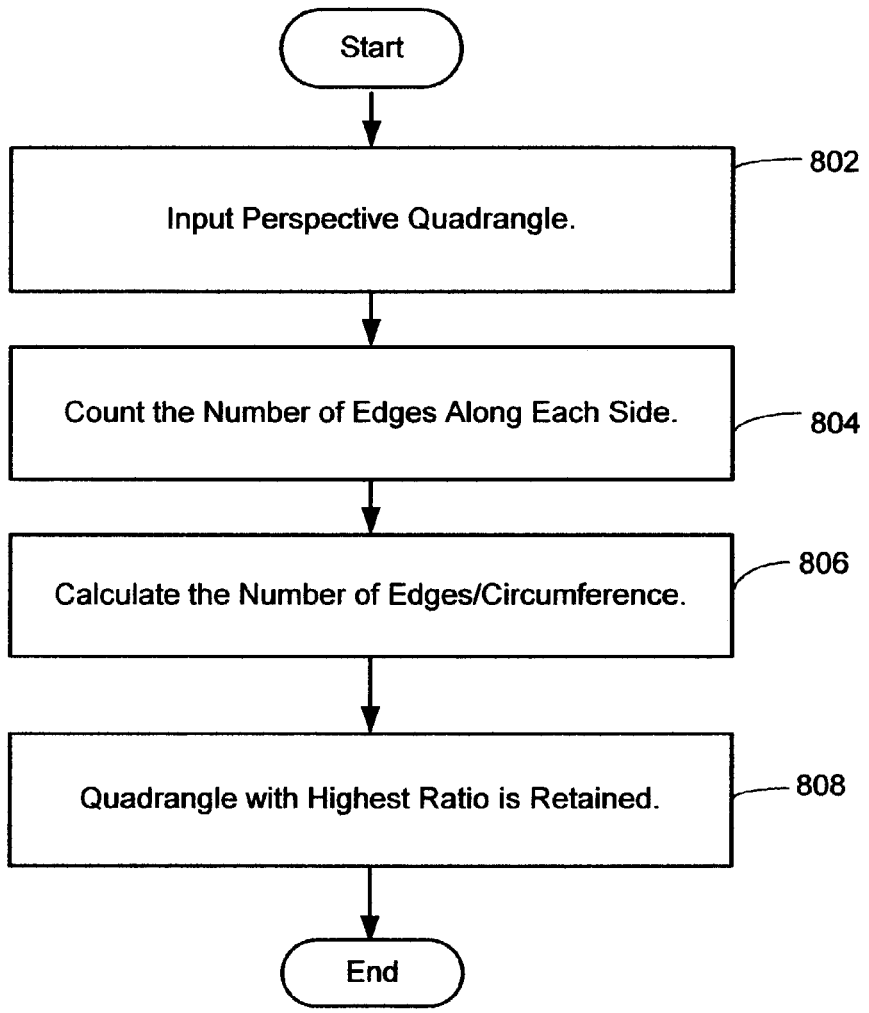
FIG. 8 is a flow diagram depicting the system and process of verifying an identified quadrangle in the system and method according to the present invention.

The lines detected from Hough space are infinite lines: they do not indicate where the supporting edges are. For example, the four lines in FIG. 7 would pass all of the tests described in the previous paragraph, although the formed quadrangle is not a real one. Hence, the process of quadrangle verification is employed to identify the four corners of the quadrangle. For example, there might be six intersections between the four identified lines, but there should only be four corners for a quadrangle. To solve this problem, the lines are first sorted by their angle to the horizontal axis. The four corners are the four intersections between the line pairs in the sorting order (1 and 2, 2 and 3, 3 and 4, 4 and 1). It is then determined how many edges in the image lie on those lines formed by these corners. As shown in FIG. 8, to verify whether a quadrangle is a real one, one walks through the side of the quadrangle and counts the number of edges along the sides (process actions 802 and 804). In one embodiment of the invention, to determine the number of pixels that should belong to a particular line probabilistic methods are used. An edge within 3 pixels from a side of the quadrangle and having similar orientation is considered to belong to the quadrangle. The ratio of the number of supporting edges to the circumference is calculated, where the circumference is calculated as the sum of the distance between the four pairs of corners, measured in pixels and is used as the quality measure of the quadrangle (process action 806). The quadrangle having the highest quality measure is retained as the one that is sought, as shown in process action 808.

2.2.5 Quadrangle Refining

Quadrangle refining can optionally be employed to refine the quadrangle that is identified as encompassing the whiteboard. The lines detected by the aforementioned system and process may not be very accurate because of the discretization of the Hough space. To improve accuracy, line fitting is performed for each side. To do this, first all edges in a small neighborhood (e.g., 10 pixels in one embodiment) and having similar orientation are found. Then a least median squares method is used to detect outliers [4], and finally least-squares fitting is performed to the remaining edges [1].

2.3 Estimating Pose and Aspect Ratio of a Rectangular Shape from One Image, and Camera's Focal Length.

Because of perspective distortion, the image of a rectangle appears to be a quadrangle. However, since it is known that the whiteboard is a rectangle in space, it is possible to estimate both the camera's focal length and the rectangle's aspect ratio.

2.3.1 Geometry of a Rectangle

Figure 9:
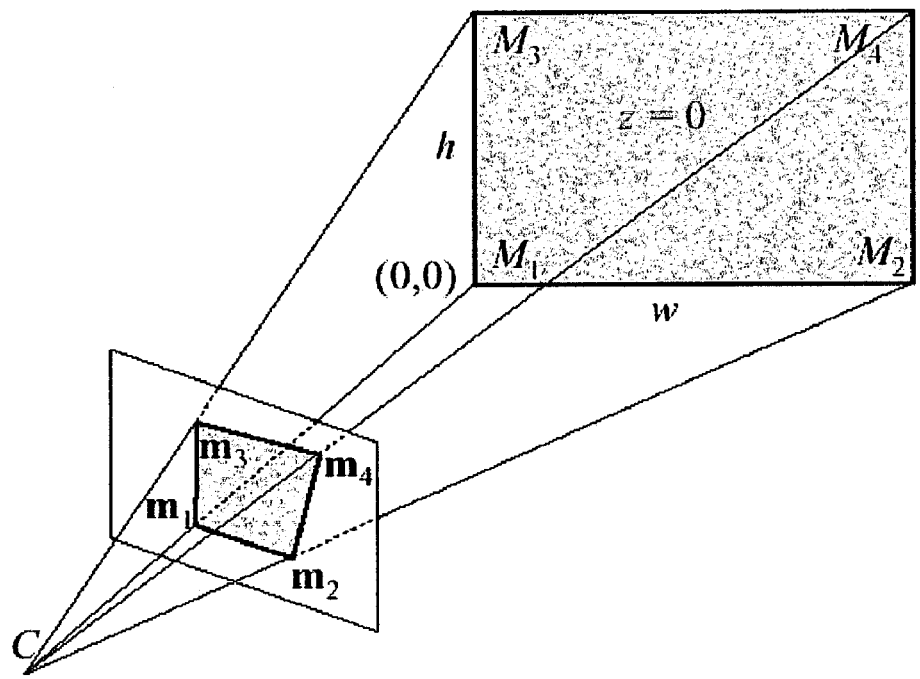
FIG. 9 shows the geometry of a rectangle.

Referring to FIG. 9, without loss of generality, it is assumed that the rectangle is on the plane z=0 in the world coordinate system. Let the width and height of the rectangular shape be w and h. Let the coordinates of the four corners, $M_i(i=1, \ldots, 4)$, be (0,0), (w,0), (0,h), and (w,h) in the plane coordinate system (z=0). The projection of the rectangle in the image is a quadrangle. The observed corners in the image are denoted by $m_1$, $m_2$, $m_3$, and $m_4$, respectively. Furthermore, $\tilde{x}$ is used to denote the augmented x vector by adding 1 as the last element to vector x, i.e., $\tilde{x} = [x_1, \ldots x_n, 1]^T$ if $x=[x_1, \ldots x_n]^T$.

The standard pinhole model is used to model the projection from a space point M to an image point m:

$$\lambda \tilde{m} = A[Rt]\tilde{M}$$

$$A = \begin{bmatrix} f & 0 & u_0 \\ 0 & sf & v_0 \\ 0 & 0 & 1 \end{bmatrix} \text{ and } R = [r_1 \; r_2 \; r_3]$$

where f is the focal length of the camera, $\lambda$ is a scalar factor, s is the pixel ratio, A represents a matrix of the camera parameters, $u_0$ and $v_0$ describe the coordinates of the image center, and (R, t) describes the 3D transformation between the world coordinate system, in which the rectangle is described, and the camera coordinate system. In the above model, it is assumed that the pixels are not skew. Substituting the 3D coordinates of the corners yields $$\lambda_1 \tilde{m}_1 = At \quad (2)$$

$$\lambda_2 \tilde{m}_2 = wAr_1 + At \quad (3)$$

$$\lambda_3 \tilde{m}_3 = wAr_2 + At \quad (4)$$

$$\lambda_4 \tilde{m}_4 = wAr_1 + hAr_2 + At \quad (5)$$

Substituting (3)-(2), (4)-(2) and (5)-(2) gives respectively $$\lambda_2 \tilde{m}_2 - \lambda_1 \tilde{m}_1 = wAr_1 \quad (6)$$

$$\lambda_3 \tilde{m}_3 - \lambda_1 \tilde{m}_1 = hAr_2 \quad (7)$$

$$\lambda_4 \tilde{m}_4 - \lambda_1 \tilde{m}_1 = wAr_1 + hAr_2 \quad (8)$$

Substituting (8)-(6)-(7) yields $$\lambda_4 \tilde{m}_4 = \lambda_3 \tilde{m}_3 + \lambda_2 \tilde{m}_2 - \lambda_1 \tilde{m}_1 \quad (9)$$

Computing the cross product of each side with $\tilde{m}_4$ yields $$0 = \lambda_3 \tilde{m}_3 \times \tilde{m}_4 + \lambda_2 \tilde{m}_2 \times \tilde{m}_4 - \lambda_1 \tilde{m}_1 \times \tilde{m}_4 \quad (10)$$

Computing the dot product of the above equation with $\tilde{m}_3$ yields $$\lambda_3(\tilde{m}_3 \times \tilde{m}_4) \cdot \tilde{m}_3 = \lambda_1(\tilde{m}_1 \times \tilde{m}_4) \cdot \tilde{m}_4$$

Thus, $$\lambda_2 = k_2 \lambda_1 \quad \text{with } k_2 = \frac{(\tilde{m}_1 \times \tilde{m}_4) \cdot \tilde{m}_3}{(\tilde{m}_2 \times \tilde{m}_4) \cdot \tilde{m}_3} \quad (11)$$

Similarly, computing the dot product of (10) with $\tilde{m}_2$ yields $$\lambda_3 = k_3 \lambda_1 \quad \text{with } k_3 = \frac{(\tilde{m}_1 \times \tilde{m}_4) \cdot \tilde{m}_2}{(\tilde{m}_2 \times \tilde{m}_4) \cdot \tilde{m}_2} \quad (12)$$

Substituting (11) into (6) yields, $$r_1 = \lambda_1 w^{-1} A^{-1} n_2 \quad (13)$$

with $$n_2 = k_2 \tilde{m}_2 - \tilde{m}_1 \quad (14)$$

Similarly, substituting (12) into (7) yields $$r_2 = \lambda_1 h^{-1} A^{-1} n_3 \quad (15)$$

with $$n_3 = k_3 \tilde{m}_3 - \tilde{m}_1 \quad (16)$$

From the properties of a rotation matrix, $r_1 \cdot r_2 = 0$. Therefore, from (13) and (15), one obtains $$n_2^T A^{-T} A^{-1} n_3 = 0 \quad (17)$$

Again from the properties of a rotation matrix, $r_1 \cdot r_1 = 1$ and $r_2 \cdot r_2 = 1$. Therefore, from (13) and (15), the following is derived $$1 = \lambda_1^2 w^{-2} n_2^T A^{-T} A^{-1} n_2 \quad (18)$$

$$1 = \lambda_1^2 h^{-2} n_3^T A^{-T} A^{-1} n_3 \quad (19)$$

Dividing these two equations gives the aspect ratio of the rectangular shape:

$$\left(\frac{w}{h}\right)^2 = \frac{n_2^T A^{-T} A^{-1} n_2}{n_3^T A^{-T} A^{-1} n_3} \quad (20)$$

This equation says clearly that the absolute size of the rectangle cannot be determined from an image. This is obvious since a bigger rectangular shape will give the same image if it is located further away from the camera.

2.3.3 Estimating Camera's Focal Length and Rectangle's Aspect Ratio.

In the last subsection, two fundamental constraints (17) and (20) were derived. Now one can extract useful information from the quadrangle in the image.

No knowledge is assumed of the rectangle in the space (i.e., unknown width and height). Since there are only two constraints, some knowledge of the camera will be assumed. Fortunately, with modern cameras, it is very reasonable to assume that the pixels are square (i.e., s=1) and the principal point is at the image center (i.e., known as $u_0$ and $v_0$). Given $u_0$, $v_0$ and s, it is possible to compute the focal length f from equation (17). This gives $$f^2 = -\frac{1}{n_{23}n_{33}s^2} + \{[n_{21}n_{31} - (n_{21}n_{33} + n_{23}n_{31})u_o + n_{23}n_{33}u_o^2]s^2 + \quad (21)$$
$$[n_{22}n_{32} - (n_{22}n_{33} + n_{23}n_{32})v_o + n_{23}n_{33}v_o^2]\}$$

where $n_{2i}$ (respectively $n_{3i}$) is the i-th component of $n_2$ (respectively $n_3$). The solution does not exist when $n_{23}=0$ or $n_{33}=0$. It occurs when $k_2=1$ or $k_2=1$, respectively.

As soon as $f$ is estimated, the camera's intrinsic parameters are all known, and the aspect ratio of the rectangle is readily computed by equation (20).

(Equation (20) can be used in a different way. If the aspect ratio of the rectangle is given, it is possible to use that equation to estimate the focal length. Together with (17), there are then two equations to estimate the focal length, leading to a more reliable estimation. However, this is not what was assumed in this work).

Once A is known, the pose of the rectangle shape can be determined. From (13)

$$r_1 = A^{-1}n_2/\|A^{-1}n_2\| \quad (22)$$

and from (15)

$$r_2 = A^{-1}n_3/\|A^{-1}n_3\| \quad (23)$$

In turn, $$r_3 = r_1 \times r_2 \quad (24)$$

The translation vector can be determined from (2), i.e., $$t = \lambda_1 A^{-1}\tilde{m} \quad (25)$$

Note that the translation can only be determined up to a scale factor $\lambda_1$, which depends on the size of the rectangle as can be seen from (18) and (19). This is obvious since a bigger rectangular shape will give the same image if it is located further away from the camera.

2.4 Rectification.

Figure 10:
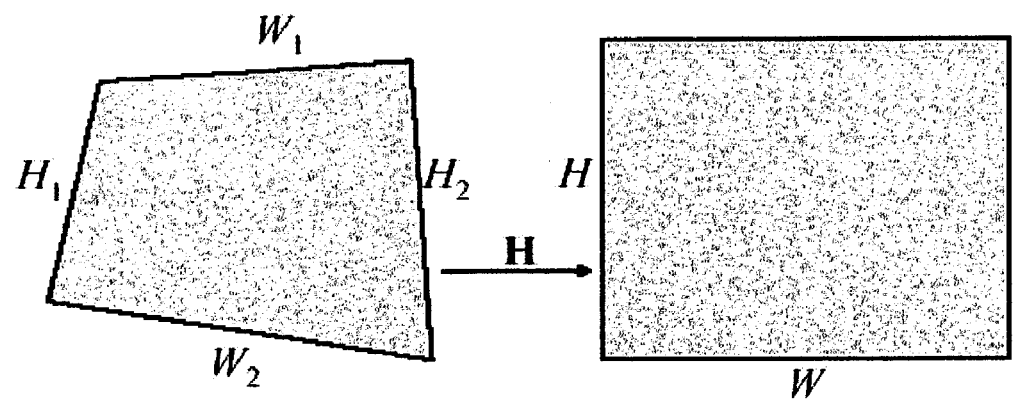
FIG. 10 depicts the rectification of a whiteboard image. Left is the original shape and right is the rectified shape.

The next task is to rectify the whiteboard image into a rectangular shape with the estimated aspect ratio. For that, it is necessary to know the size of the final image. The size is determined in order to preserve in the rectified image maximum information of the original image. In other words, a pixel in the original image should be mapped to at least one pixel in the rectified image. Referring to FIGS. 10 and 11, the side lengths of the quadrangle in the original image are denoted by $W_1$ and $W_2$ for the upper and lower sides, and by $H_1$ and $H_2$ for the left and right side. As shown in process action 1102, let $\hat{W}=\max(W_1,W_2)$ and $\hat{H}=\max(H_1,H_2)$. Let $\hat{r}=\hat{W}/\hat{H}$. Denote the estimated aspect ratio by r. The size of the rectified image is determined as follows: $W=\hat{W}$ and $H=W/r$ if $\hat{r} \geq r$; otherwise, $H=\hat{H}$ and $W=rH$ (process actions 1104 through 1108). Once the size is determined, the rectifying matrix H (homography) is easily computed (process action 1110), and the color of the rectified image is computed through bilinear or bi-cubic interpolation from the original image via conventional methods (process action 1112). FIG. 12 shows two rectified images of the wh Other rectified images are also similar, and are thus not shown.

2.5 White Balancing.

Figure 14:
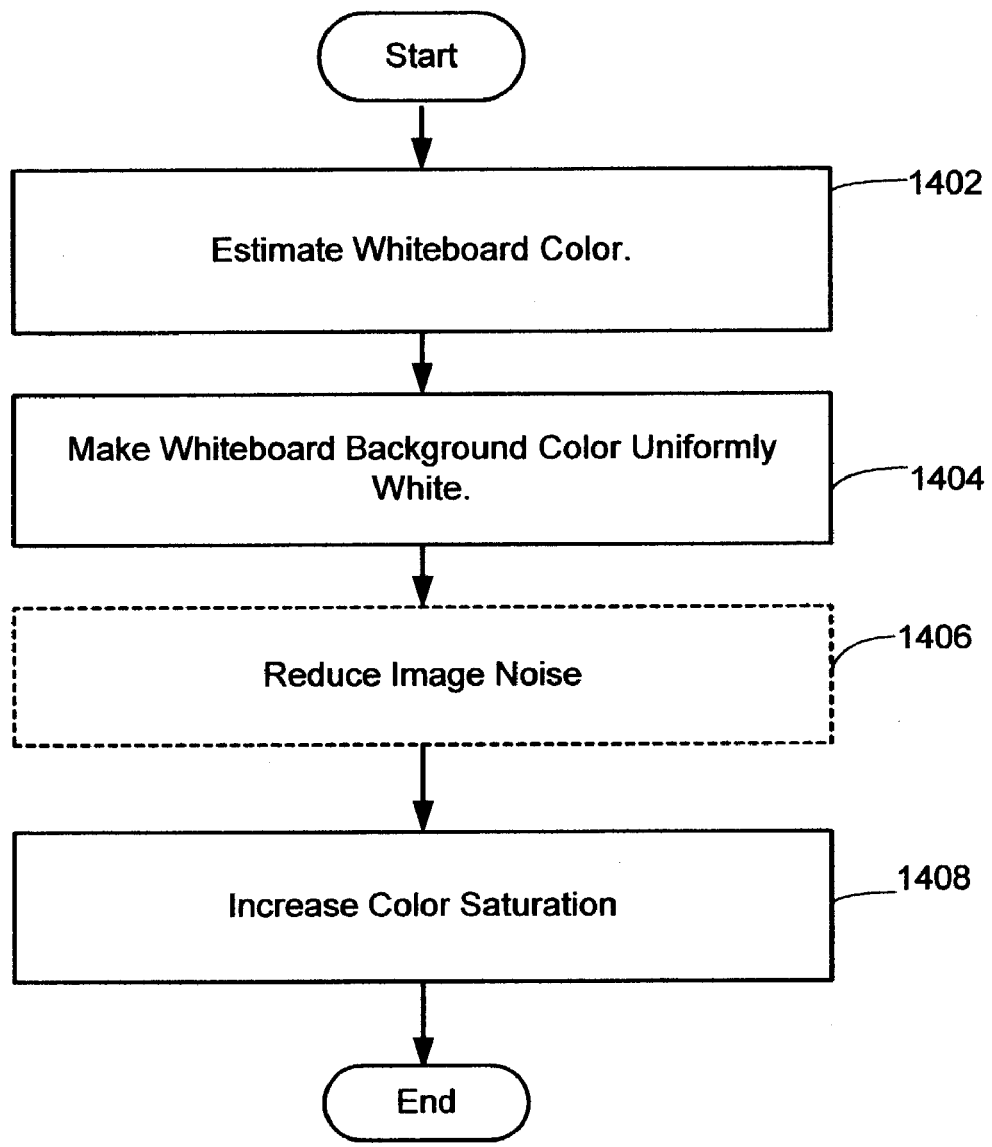
FIG. 14 is a flow diagram depicting the white-balancing according to the system and method of the invention.

The goal of white balancing or color enhancement is to transform the input whiteboard image into an image with the same pen strokes on uniform background (usually white). For each pixel, the color value=$C_{light}$, the pen color=$C_{pen}$, and the whiteboard color=$C_{wb}$. Since the whiteboard is physically built to be uniformly colored, it can be assumed that $C_{wb}$ is constant for all the pixels. The lack of uniformity in the input image is due to different amounts of incident light to each pixel. Therefore, the first procedure in white balancing is to estimate $C_{light}$ for each pixel, the result of which is in fact an image of the blank whiteboard, as shown in FIG. 14, process action 1402.

Figure 15:
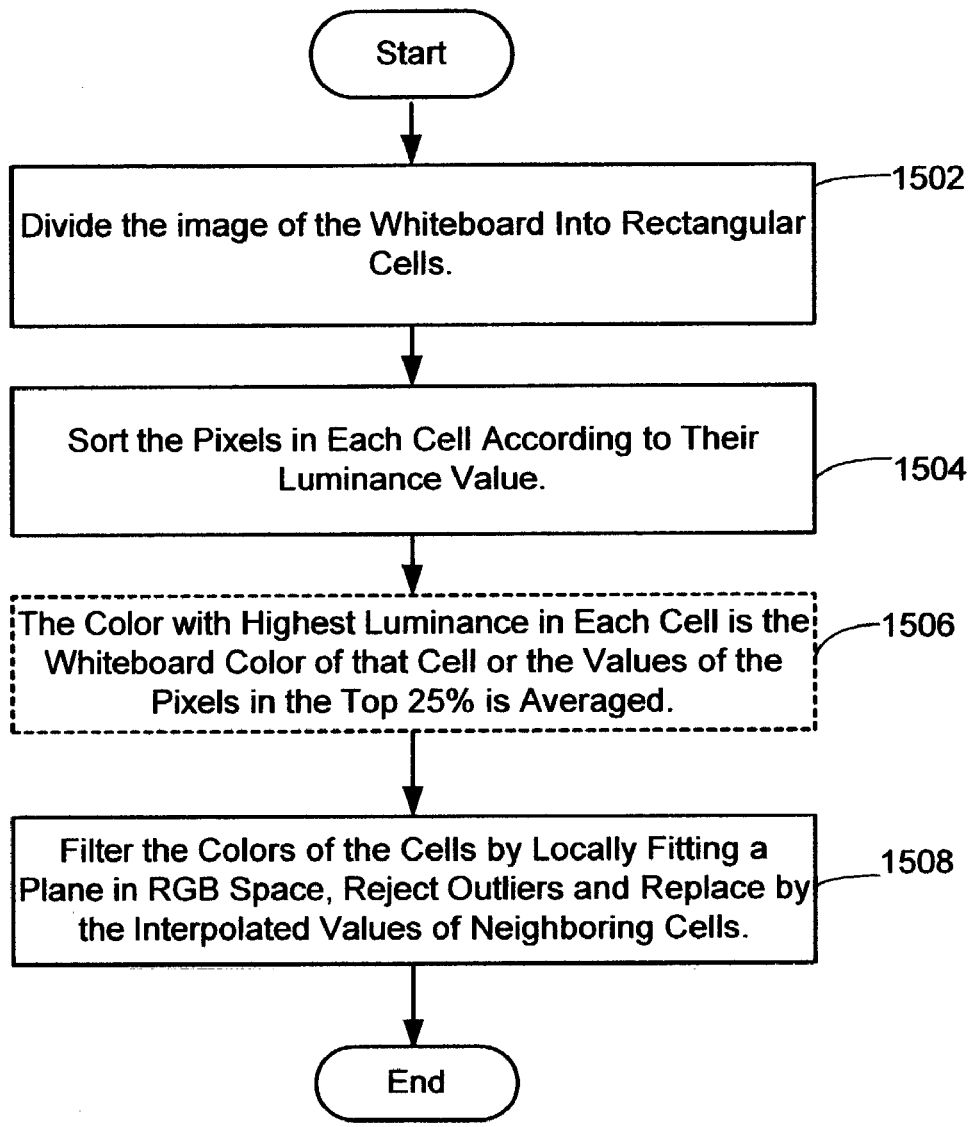
FIG. 15 is a flow diagram depicting the calculation of whiteboard color according to the system and method of the invention.
Figure 16A:
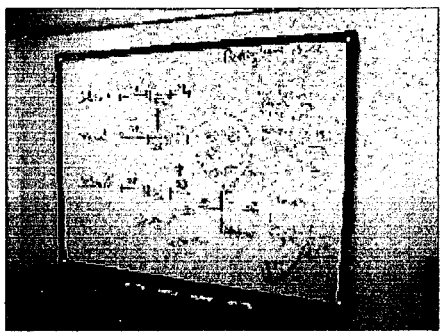
FIGS. 16A–16D depict an example of automatic whiteboard detection and rectification.
Figure 16B:
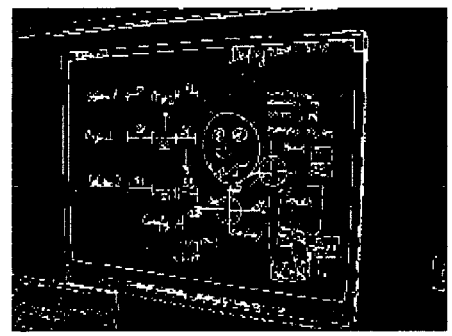
Figure 16C:
Figure 16D:
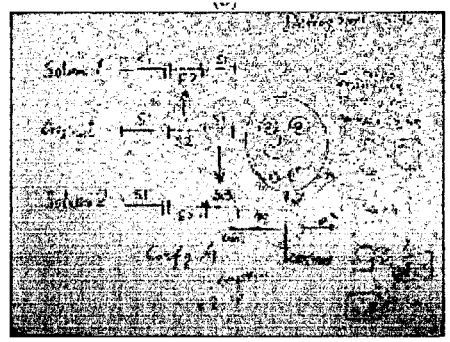
Figure 17A:
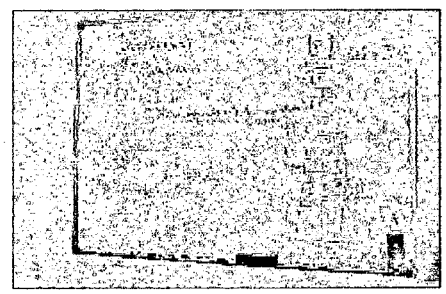
FIGS. 17A–D should an example of automatic whiteboard detection and rectification.
Figure 17B:
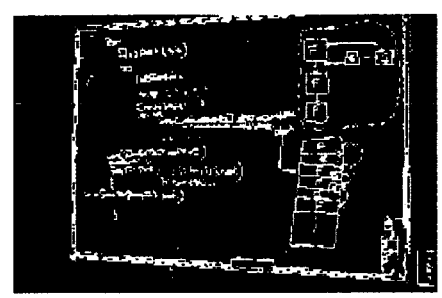
Figure 17C:
Figure 17D:
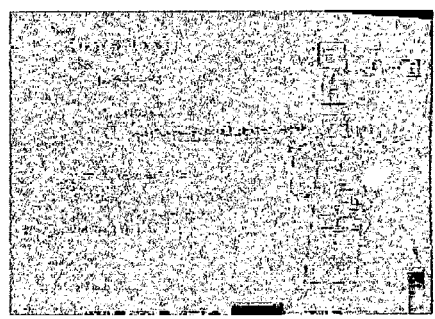

The system computes the blank whiteboard image by inferring the value of pixels covered by the strokes from their neighbors. Rather than computing the blank whiteboard color at the input image resolution, the computation is done at a coarser level to lower the computational cost. This approach is reasonable because the blank whiteboard colors normally vary smoothly. The process actions of estimating the whiteboard color are shown in FIG. 15 and are as follows:

1. Divide the whiteboard region into rectangular cells (process action 1502). The cell size should preferably be roughly the same as what the size of a single character on the whiteboard is expected to be (in one working embodiment of the invention this was 15 by 15 pixels).

2. Sort the pixels in each cell by their luminance values (process action 1504). Since the ink absorbs the incident light, the luminance of the whiteboard pixels is higher than pen stroke pixels. The whiteboard color within the cell is therefore the color with the highest luminance (process action 1506). In practice, the colors of the pixels in the top 25 percentile are averaged in order to reduce the error introduced by sensor noise.

3. Filter the colors of the cells by locally fitting a plane in the RGB space (process action 1508). Occasionally there are cells that are entirely covered by pen strokes, the cell color computed in Step 2 above is consequently incorrect. Those colors are rejected as outliers by the locally fitted plane and are replaced by the interpolated values from its neighbors.

Once the image of the blank whiteboard is computed, the input image is color enhanced in two steps:

1. Make the background uniformly white (process action 1406). For each cell, the computed whiteboard color (equivalent to the incident light $C_{light}$) is used to scale the color of each pixel in the cell:

$$C_{out} = \min\left(1, \frac{C_{input}}{C_{light}}\right).$$

2. Reduce the image noise and increase the color saturation of the pen strokes. The value of each color channel of each pixel is remapped according to an S-shaped curve: $0.5 - 0.5*\cos(C_{out}p\pi)$. The steepness of the S-curve is controlled by p. In one working embodiment of the invention, p is set to 0.75 (process action 1408).

2.6 Vectorization.

The vectorized form of data gives a better idea which points in an image belong together. Standard vectorization techniques are used to convert the lines, curves and other whiteboard content into vectors. A curve drawn through the center of the pixels to be vectorized is approximated. The curve is defined by its shape and a predetermined width via conventional methods.

3.0 Exemplary Working Embodiment

The following paragraphs describe an exemplary working embodiment of the system and method of converting whiteboard content into an editable electronic document.

3.1 Experiments with Automatic Whiteboard Rectification.

The technique of automatically rectifying the whiteboard was tested with more than 50 images taken by different people with different camera in different rooms. All the tuning parameters were fixed once for all. The success rate was more than 90%. The four failures were due to poor boundary contrast, or to too noisy edge detection. In this subsection, two examples of success (FIG. 16, 17) and one example of failure (FIG. 18) are shown.

FIG. 16 is a relatively simple example because the whiteboard boundary is very clear. The image resolution is 2272×1704 pixels. The detected edges are shown in white in FIG. 16B. As can be seen in the Hough image (FIG. 16C), the peaks are quite clear. The corners of the whiteboard are accurately estimated, as shown in the small white squares in FIG. 16A. The cropped and rectified image is shown in FIG. 16D. The estimated aspect ratio is 1.326, very close to the ground truth 4/3. The estimated focal length is 2149 pixels.

FIG. 17 shows another example. The resolution is 1536× 1024 pixels. This example has one particular thing to notice: the upper right corner is not in the image. It does not affect the performance of the system and method according to the invention since it first detects boundary lines rather than corners. In FIG. 17A, the three detected visible corners are shown in small red discs. The fourth corner, although visible, is also accurately estimated, as can be verified by the cropped and rectified image shown in FIG. 17D, where the invisible region (upper right corner) is filled with black pixels due to lack of information. The estimated aspect ratio is 1.378. Ground truth is not available because the image was provided by an external person. The estimated focal length is 2032 pixels.

Figure 18A:
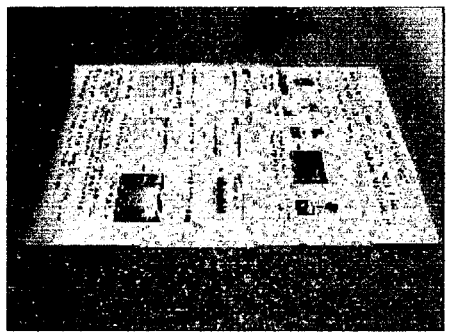
FIGS. 18A–18D show a failure example.
Figure 18B:
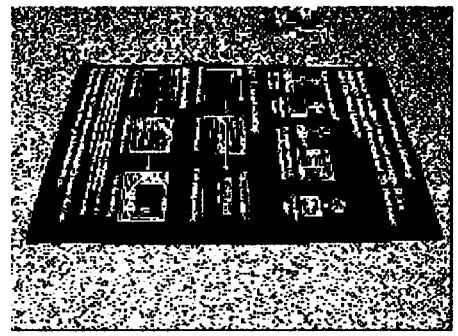
Figure 18C:
Figure 18D:
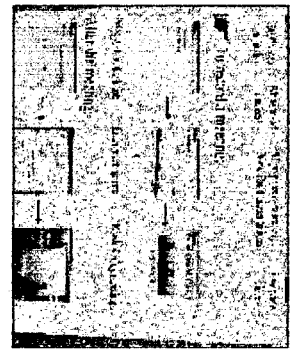

The system and method of the invention applies not only to whiteboard images but also to posters, as long as the poster's color is distinct from the walls. Here, however, an example of a failure with a poster is shown (FIG. 18A). The failure was due to the fine texture on the wall. As can be seen in FIG. 18B, the edge image is very noisy, and the number of edges is huge. The noise is also reflected in the Hough image (FIG. 18C). The detected corners, as shown in red dots in FIG. 18A, are not what were expected. For this example, a different edge detector could be applied or the threshold could be changed to ignore the fine texture.

3.2 Experimental Results on Aspect Ratio Estimation.

In this section, experimental results on aspect ratio are provided. Six images of the same white board, as shown in FIG. 13A through 13F, were taken from different angles. The most frontal view is image 13B. The whiteboard was manually measured with a ruler, and the size was about 42"×40" (note: 1"~2.54 cm). The aspect ratio was therefore 1.05 and this was used as ground truth.

In each image, the four corners of the whiteboard were manually selected with a cursor, and the technique described previously to estimate the focal length of the camera and the aspect ratio of the whiteboard. The results are shown in Table 1.

Results with Images Shown in FIG. 13

| | image | | | | | |
|---|---|---|---|---|---|---|
| | (a) | (b) | (c) | (d) | (e) | (f) |
| aspect ratio | 1.028 | 1.035 | 1.031 | 1.021 | 1.019 | 0.990 |
| error (%) | 2.1 | 1.4 | 1.8 | 2.8 | 3.0 | 5.7 |
| bounding box | 0.966 | 1.035 | 0.981 | 0.892 | 0.843 | 0.727 |
| difference (%) | 5.1 | 1.4 | 6.6 | 15.1 | 19.7 | 30.8 |
| focal length | 2202 | 2442 | 2073 | 2058 | 2131 | 2030 |

The second row shows the estimated values of the aspect ratio, while the third row shows its relative error compared to ground truth. The error is mostly less than 3%, except for FIG. 13F that was taken from a very skewed angle. There are two major sources contributing to the errors: The first is the precision of the manually clicked points; the second is lens distortion that is currently not modeled. Lens distortion can be clearly observed in FIG. 13. The error of the estimated aspect ratio tends to be higher for images taken from a larger angle. This is expected because the relative precision of the corner points is decreasing. For reference, the aspect ratio of the bounding box of the whiteboard image in the fourth row of Table 1, and its relative difference with respect to the ground truth in the fifth row are also provided. The relative difference can go up 30%. It is clear that it is not reasonable to use the aspect ratio of the bounding box to rectify the whiteboard images. The sixth row of Table 1 shows the estimated focal length, which varies around 2200.

Figure 19A:
FIGS. 19A and 19B shows the system and method according to the invention working on a whiteboard with complex drawings and complex lighting conditions.
Figure 19B:
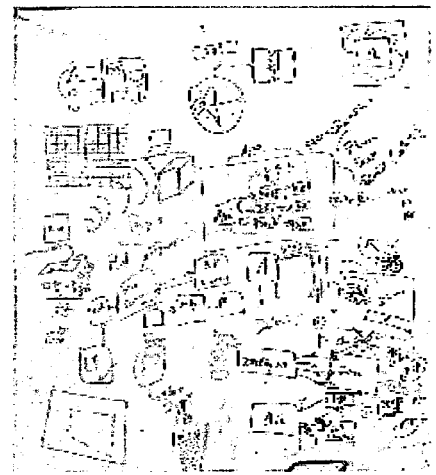

FIG. 19 shows the system and method according to the invention working on a whiteboard with complex drawings and complex lighting conditions.

Figure 20A:
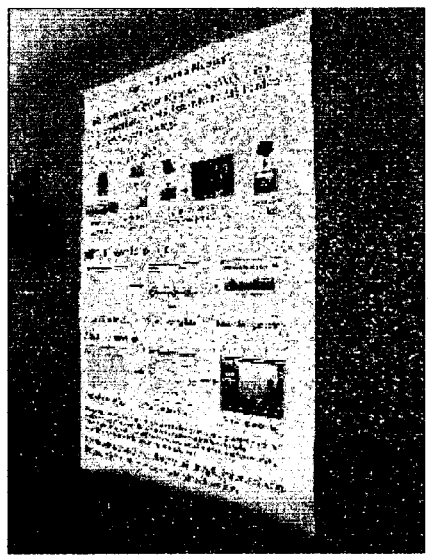
FIGS. 20A and 20B show the system and method according to the invention working on a poster.
Figure 20B:
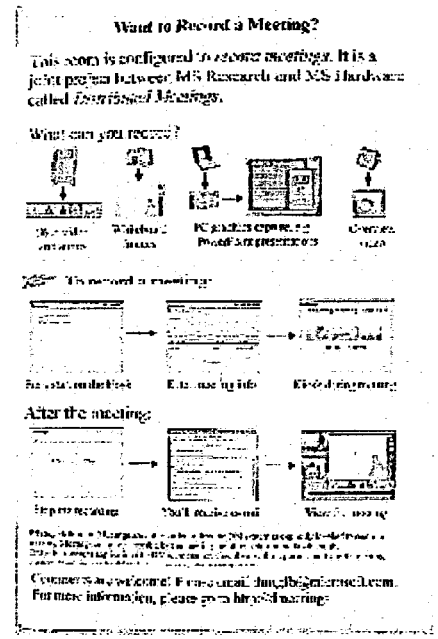

FIG. 20 shows that the system and method according to the invention also works on a poster.

Figure 21A:
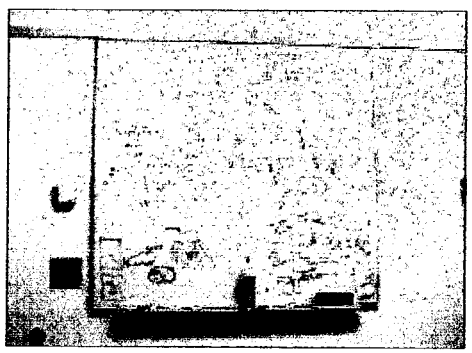
FIG. 21A and 21B show two images of the same whiteboard but taken from very different angles.
Figure 21B:
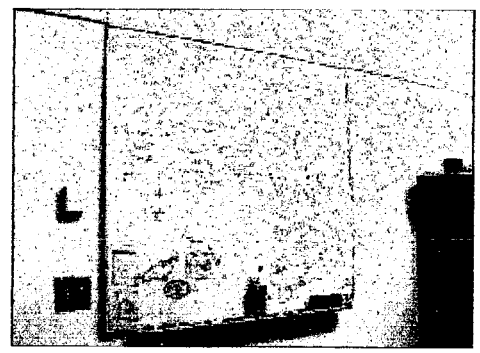

FIG. 21 shows two images of the same whiteboard but taken from very different angles. The aspect ratio estimated from both images is very close to ground truth.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] O. Faugeras, *Three-Dimensional Computer Vision: A Geometric Viewpoint*, MIT Press, 1993.
[2] O. Faugeras and Q.-T. Luong, *The Geometry of Multiple Images*, MIT Press, 2001.
[3] R. Hartley and A. Zisserman, *Multiple View Geometry*, Cambridge University Press, 1998.
[4] Z. Zhang, Parameter estimation techniques: a tutorial with application to conic fitting", *Image and Vision Computing*, 15(1):59–76, 1997.

Wherefore, what is claimed is:

1. A process for converting the contents of a whiteboard into an electronic document, comprising the process actions of:
acquiring a digitized image of a whiteboard having four edges and content written thereon;
locating a quadrangle formed by the edges of the whiteboard in the image;
estimating the actual aspect ratio of the whiteboard from the quadrangle in the image;
rectifying the quadrangles; and
white-balancing the whiteboard background color to create a version of the image wherein the whiteboard background color is uniform.

2. The process of claim 1 further comprising the process action of increasing stroke saturation of strokes written on the whiteboard.

3. The process of claim 1 further comprising the process action of converting said image of the whiteboard content into vector equations describing the content of the whiteboard.

4. The process of claim 3 wherein said whiteboard content in vector equation format are processed using handwriting recognition procedures to provide an editable electronic document.

5. The process of claim 1 wherein said process action for locating the quadrangle in the image comprises the following process actions:
inputting said digitized image of said whiteboard;
detecting edges in the image;
locating straight lines in said image using said edges and a Hough transform; and
forming a quadrangle encompassing boundaries of the whiteboard using said straight lines.

6. The process of claim 5 further comprising the process action of verifying the formed quadrangle.

7. The process of claim 6 wherein the process action of verifying the quadrangle encompassing the whiteboard boundaries comprises the process actions of:
for each possible quadrangle,
inputting a perspective quadrangle formed from said straight lines;
counting the number of edges along each side;
calculating the circumference of said perspective quadrangle;
calculating the ratio of the number of edges to the circumference; and
retaining the quadrangle with the greatest ratio as the quadrangle encompassing the whiteboard boundaries.

8. The process of claim 5 further comprising the process action of refining the quadrangle encompassing the whiteboard boundaries.

9. The process of claim 5 wherein said process action for detecting the edges of the whiteboard comprises the following process actions:
converting said image to grayscale if said image is a colored image;
for each pixel in said image,
using a Sobel filter to compute a gradient in the x direction and a gradient in the y direction;
computing an overall gradient by adding the gradient in the x direction and a gradient in the y direction and taking the absolute value; and
if said overall gradient is greater than a prescribed gradient threshold designating said pixel as an edge pixel.

10. The process of claim 9 wherein said prescribed gradient threshold is 40.

11. The process of claim 5 wherein said process action of locating straight lines in said image using a Hough transform comprises the process actions of:
dividing said image into cells;
inputting each edge, comprised of a series of edge pixels, detected and designating said edge as a line with an orientation;
if the said line crosses into a cell, assigning this cell a vote; and
once all edges have been processed, assigning all cells that have a significant number of votes as being a straight line.

12. The process of claim 11 wherein said cells that have greater than five percent of the total number of votes are assigned as being a straight line.

13. The process of claim 10 wherein said line is defined by the equation $x_0 \cos \theta + y_0 \sin \Theta = \rho$ and wherein the range of angle $\theta$ is $[-180°, 180°]$; and for a given edge at $(x_0, y_0)$, its orientation is computed by $\theta = \mathrm{atan2}(G_y, G_x)$ and its distance $\rho = x_0 \cos \theta + y_0 \sin \theta$, where $G_y$, $G_x$ are the gradients in the y and x directions, respectively.

14. The process of claim 13 wherein said process action of forming said quadrangle comprises the process actions of:
inputting sets of lines that have been identified as edges of a perspective quadrangle;
if opposite lines do not have opposite orientations, discarding said perspective quadrangle;
if opposite lines are not far from each other, discarding said perspective quadrangle;
if the angle between two neighboring lines is not close to plus or minus 90 degrees, discarding said perspective quadrangle;
if the orientation of said lines in said perspective quadrangle are not consistent in either a clockwise or counterclockwise direction, discarding said perspective quadrangle;
if the quadrangle circumference is not greater than a quarter of its width plus its height, discarding said perspective quadrangle; and
forming said quadrangle with said sets of lines if said perspective quadrangle was not previously discarded.

15. The process of claim 1 wherein the process action for estimating the actual aspect ratio of the whiteboard from the quadrangle in the image comprises the process actions of:
for a rectangle with width and height of w and h and the coordinates of the four corners, $M_i$ (i=1, ..., 4)=(0, 0), (w, 0), (0, h), (w, h) in the plane coordinate system (z=0), whose projection of the rectangle in the image is a quadrangle with observed corners in the image are denoted by $m_1$, $m_2$, $m_3$, and $m_4$, respectively, and modeling the projection from a space point M to an image point m as $\lambda \tilde{m} = A[Rt]\tilde{M}$ where $$A = \begin{bmatrix} f & 0 & u_0 \\ 0 & sf & v_0 \\ 0 & 0 & 1 \end{bmatrix}$$

and R=[$r_1$ $r_2$ $r_3$] where f is the focal length of the camera, λ is a scalar factor, s is the pixel ratio, A is a matrix of the camera parameters, $U_0$, $V_0$ are the coordinates of the image center, and (R, t) is the 3D transformation between the world coordinate system, in which the rectangle is described, and the camera coordinate system, x̃ is used to denote the augmented x vector by adding 1 as the last element to vector x, i.e., x̃=[$x_1$, ... $x_n$, 1]$^T$ if x=[$x_1$, ... $x_n$]$^T$ estimating the aspect ratio w/h of the whiteboard as the square root of $$\frac{n_2^T A^{-T} A^{-1} n_2}{n_3^T A^{-T} A^{-1} n_3} \text{ where}$$

$$n_2 = \frac{(\tilde{m}_1 \times \tilde{m}_4) \cdot \tilde{m}_3}{(\tilde{m}_2 \times \tilde{m}_4) \cdot \tilde{m}_3} \tilde{m}_2 - \tilde{m}_1 \text{ and}$$

$$n_3 = \frac{(\tilde{m}_1 \times \tilde{m}_4) \cdot \tilde{m}_2}{(\tilde{m}_2 \times \tilde{m}_4) \cdot \tilde{m}_2} \tilde{m}_3 - \tilde{m}_1.$$

16. The process of claim 15 wherein the process action for rectifying the image comprises the process actions of:
   determining the maximum of the upper and lower sides of the quadrangle;
   determining the maximum of the left and right sides of the quadrangle;
   calculating the ratio of the maximum of the upper and lower sides to the maximum of the left and right sides;
   if the ratio of the maximum of the upper and lower sides to the maximum of the left and right sides is greater than the estimated aspect ratio, calculating the width of the rectified quadrangle as the maximum of the upper and lower sides of the quadrangle and the height of the rectified quadrangle as the width divided by the estimated aspect ratio;
   if the ratio of the maximum of the upper and lower sides to the maximum of the left and right sides is less than the estimated aspect ratio, calculating the height of the rectified quadrangle as the maximum of the left and right sides of the quadrangle and the width of the rectified quadrangle as the estimated aspect ratio multiplied by the height;
   computing a rectifying homography; and
   mapping new pixel locations using said rectifying homography.

17. The process of claim 16 further comprising applying new colors to said rectified image.

18. The process of claim 17 wherein said applied new colors are computed by one of:
   bilinear interpolation; and
   bi-cubic interpolation.

19. The process of claim 1 wherein the white-balancing process action comprises:
   estimating the background color of the whiteboard, wherein said background color is the whiteboard color under perfect lighting and without anything written on it;
   making the whiteboard background uniformly white; and
   increasing the color saturation of pen strokes written on said whiteboard.

20. The process of claim 19 further comprising the process action of reducing image noise prior to increasing the saturation of the pen strokes written on said whiteboard.

21. The process of claim 19 wherein the process action for estimating the background color of the x whiteboard comprises the process actions of:
   dividing the image of the whiteboard into rectangular cells;
   sorting the pixels in each cell according to their luminance value; and
   assigning the color with highest luminance in each cell as the whiteboard color of that cell.

22. The process of claim 21 further comprising the process action of filtering the colors of the cells to reject outlying color values.

23. The process of claim 22 wherein the process action of filtering the colors of the cells comprises:
   locally fitting a plane in RGB space; and
   rejecting outlying values and replacing them with interpolated values of neighboring cells.

24. The process of claim 19 wherein the process action for estimating the background color of the whiteboard comprises the process actions of:
   dividing the image of the whiteboard into rectangular cells;
   sorting the pixels in each cell according to their luminance value;
   averaging the cells with a luminance value in the top 25 percent; and
   assigning each cell the averaged luminance value.

25. The process of claim 24 further comprising the process action of filtering the colors of the cells to reject outlying values.

26. The process of claim 25 wherein the process action of filtering the colors of the cells comprises:
   locally fitting a plane in RGB space; and
   rejecting outlying values and replacing them with interpolated values of neighboring cells.

27. A system for converting markings on a planar object into an electronic document the system comprising:
   a general purpose computing device; and
   a computer program comprising program modules executable by the computing device, wherein the computing device is directed by the program modules of the computer program to,
   acquire with camera a digital Image of a four-sided planar object having content written thereon;
   locate a quadrangle formed by the edges of the planar object in the image;
   estimate the actual aspect ratio of the planar object from the quadrangle in the image;
   rectify the planar object in the image; and
   color-balance the background color of the planar object to produce a rectified and color-balanced version of the content of planar object.

28. The system of claim 27 further comprising a module for converting content written on the planar object into vectors.

29. The system of claim 28 wherein said vectors are processed using handwriting recognition procedures to provide an editable electronic document.

30. The system of claim 27 wherein said module for locating the quadrangle in the image comprises the following process actions:

inputting said image of said planar object;
detecting edges in the image;
locating straight lines in said image using said edges and a Hough transform; and
forming a quadrangle encompassing the boundaries of the planar object using said straight lines.

31. The system of claim 30 further comprising a module for verifying the formed quadrangle.

32. The system of claim 31 wherein the module for verifying the quadrangle encompassing the planar objects boundaries comprises sub-modules for:
for each possible quadrangle,
inputting a perspective quadrangle formed from said straight lines;
counting the number of edges along each side;
calculating the circumference of said perspective quadrangle;
calculating the ratio of the number of edges to the circumference; and
retaining the quadrangle with the greatest ratio as the quadrangle encompassing the whiteboard boundaries.

33. The system of claim 30 further comprising a module for refining the quadrangle encompassing the boundaries of the planar object.

34. The system of claim 30 wherein said module for detecting the edges of the planar object comprises sub-modules for:
converting said image to grayscale if said image is a colored image;
for each pixel in said image,
using a Sobel filter to compute a gradient in the x direction and a gradient in the y direction;
computing an overall gradient by taking the absolute value of the gradient in the x direction and a gradient in the y direction; and
if said overall gradient is greater than a prescribed gradient threshold designating said pixel as an edge.

35. The system of claim 30 wherein said module for locating straight lines in said image using a Hough transform comprises sub-modules for:
dividing said image into cells;
inputting each edge detected and considering it as a line with an orientation;
if the parameters of said line fall into a cell, assigning this cell a vote; and
once all edges have been processed, assigning all cells that have a significant number of votes as being a straight edge.

36. The system of claim 35 wherein said cells that have greater than five percent of the total number of votes are assigned as being a straight edge.

37. The system of claim 35 wherein said line is defined by the equation $x_0 \cos \theta + y_0 \sin \theta = \rho$ and wherein the range of angle $\theta$ is $[-180°, 180°]$; and for a given edge at $(x_0, y_0)$, its orientation is computed by $\theta = a \tan 2 (G_y, G_x)$ and its distance $\rho = x_0 \cos \theta + y_0 \sin \theta$, where $G_y$, $G_x$ are the gradients in the y and x directions, respectively.

38. The system of claim 35 wherein said module for forming said quadrangle comprises sub-modules for:
inputting sets of lines that have been identified as edges of a perspective quadrangle;
if opposite lines do not have opposite orientations, discarding said perspective quadrangle;
if opposite lines are not far from each other, discarding said perspective quadrangle;
if the angle between two neighboring lines is not close to plus or minus 90 degrees, discarding said perspective live quadrangle;
if the orientation of said lines in said perspective quadrangle are not consistent in either a clockwise or counterclockwise direction, discarding said perspective quadrangle;
if the quadrangle circumference is not greater than a quarter of its width plus its height, discarding said perspective quadrangle; and
forming said quadrangle with said sets of lines is said perspective quadrangle is not previously discarded.

39. The system of claim 27 wherein the module for estimating the actual aspect ratio of the planar object from the quadrangle in the image comprises sub-modules for:
for a planar object with width and height of w and h and the coordinates of the four corners, $M_i$ (i=1, ..., 4)=(0, 0), (w, 0), (0, h), (w, h) in the plane coordinate system (z=0), whose projection of the rectangle in the image is a quadrangle with observed corners in the image are denoted by $m_1, m_2, m_3$, and $m_4$, respectively, and modeling the projection from a space point M to an image point m as $$\lambda \tilde{m} = A[Rt]\tilde{M} \text{ where } A = \begin{bmatrix} f & 0 & u_0 \\ 0 & sf & v_0 \\ 0 & 0 & 1 \end{bmatrix} \text{ and } R = [\, r_1 \; r_2 \; r_3 \,]$$

where f is the focal length of the camera, $\lambda$ is a scalar factor, in is the pixel ratio, A is a matrix of the camera parameters, $u_0, v_0$ are the coordinates of the image center, and (R, t) is the 3D transformation between the world coordinate system, in which the rectangle is described, and the camera coordinate system, and $\tilde{x}$ is used to denote the augmented x vector by adding 1 as the last element to vector x, i.e., $\tilde{x}=[x_1, \ldots x_n, 1]^T$ if $x=[x_1, \ldots, x_n]^T$,
estimating the aspect ratio w/h of the planar object as the square root of $$\frac{n_2^T A^{-T} A^{-1} n_2}{n_3^T A^{-T} A^{-1} n_3} \text{ where}$$

$$n_2 = \frac{(\tilde{m}_1 \times \tilde{m}_4) \bullet \tilde{m}_3}{(\tilde{m}_2 \times \tilde{m}_4) \bullet \tilde{m}_3} \tilde{m}_2 - \tilde{m}_1 \text{ and } n_3 = \frac{(\tilde{m}_1 \times \tilde{m}_4) \bullet \tilde{m}_2}{(\tilde{m}_2 \times \tilde{m}_4) \bullet \tilde{m}_2} \tilde{m}_3 - \tilde{m}_1.$$

40. The system of claim 39 wherein the module for rectifying the image comprises sub-modules for:
determining the maximum of the upper and lower sides of the quadrangle;
determining the maximum of the left and right sides of the quadrangle;
calculating the ratio of the maximum of the upper and lower sides to the maximum of the left and right sides;
if the ratio of the maximum of the upper and lower sides to the maximum of the left and right sides is greater than the estimated aspect ratio, calculating the width of the rectified quadrangle as the maximum of the upper and lower sides of the quadrangle and the height of the rectified quadrangle as the width divided by the estimated aspect ratio;
if the ratio of the maximum of the upper and lower sides to the maximum of the left and right sides is less than the estimated aspect ratio, calculating the height of the rectified quadrangle as the maximum of the left and right sides of the quadrangle and the width of the rectified quadrangle as the estimated aspect ratio multiplied by the height;

computing a rectifying homography;

mapping new pixel locations using said rectifying homography; and applying new colors to the rectified quadrangle.

41. The system of claim 40 wherein said applied new colors are computed using one of:

bilinear interpolation; and bi-cubic interpolation.

42. The system of claim 27 wherein the color-balancing module comprises sub-modules for:

estimating the background color of the planar object, wherein said background color is the background color under perfect lighting and without anything written on it;

making the planar object's background uniformly colored; and increasing the color saturation of pen strokes written on said planar object.

43. The system of claim 40 wherein the module for estimating the background color of the planar object comprises sub-modules for:

dividing the image of the planar object into rectangular cells;

sorting the pixels in each cell according to their luminance value; and assigning the color with highest luminance in each cell as the background color of that cell.

44. The system of claim 43 further comprising a sub-module for filtering the background colors of the cells to reject outlying values.

45. The system of claim 42 wherein the module for estimating the background color of the planar object comprises sub-modules for:

dividing the image of the planar object into rectangular cells;

sorting the pixels in each cell according to their luminance value;

averaging the cells with a luminance value in the top 25 percent; and assigning each cell the averaged luminance value.

46. The system of claim 42 wherein the module for making the background color uniformly colored comprises a sub-module for:

for each cell, using the estimated background color to scale each pixel color in the cell.

47. The system of claim 42 wherein the module increasing the color saturation of pen strokes written on said planar object, comprises a sub-module for:

for each pixel, remapping the value of each: color channel according to an S-shaped curve.

48. The system of claim 27 wherein the four-sided planar object is a whiteboard.

49. The system of claim 27 wherein the four-sided planar object is a sheet of paper.

50. The system of claim 27 wherein the four-sided planar object is a poster.

51. A computer-readable medium having computer-executable instructions for converting the content of a whiteboard into an editable document, said computer executable instructions comprising modules for:

acquiring a digitized image of a planar object having four edges and content written thereon with a camera;

locating a quadrangle formed by the edges of the whiteboard in the image;

estimating the actual aspect ratio of the whiteboard from the quadrangle in the image;

rectifying the quadrangle; and color-balancing the planar object's background color to create a version of the image wherein the planar object's background color is uniform.

52. A process for estimating the actual aspect ratio of the planar object from the quadrangle in an image comprising the process actions of:

for a planar object with width and height of w and h and the coordinates of the four corners, (i=1, ..., 4)=(0, 0), (w, 0), (0, h), (w, h) in the plane coordinate system (z=0), whose projection of the rectangle in the image is a quadrangle with observed corners in the image are denoted by $m_1$, $m_2$, $m_3$, and $m_4$, respectively, and modeling the projection from a space point M to an image point m as $\theta\tilde{m}=A[Rt]\tilde{M}$ where $$A = \begin{bmatrix} f & 0 & u_0 \\ 0 & sf & v_0 \\ 0 & 0 & 1 \end{bmatrix}$$

and $R=[r_1\ r_2\ r_3]$ where f is the focal length of the camera, $\lambda$ is a scalar factor, s is the pixel ratio, A is a matrix of the camera parameters, $u_0$, $v_0$ are the coordinates of the image center, and (R, t) is the 3D transformation between the world coordinate system, in which the rectangle is described, and the camera coordinate system, $\tilde{x}$ is used to denote the augmented x vector by adding 1 as the last element to vector x, i.e., $\tilde{x}=[x_1, \ldots x_n, 1]^T$ if $x=[x_1, \ldots x_n]^T$, estimating the aspect ratio w/h of the planar object as the square root of $$\frac{n_2^T A^{-T} A^{-1} n_2}{n_3^T A^{-T} A^{-1} n_3}$$

where $$n_2 = \frac{(\tilde{m}_1 \times \tilde{m}_4) \cdot \tilde{m}_3}{(\tilde{m}_2 \times \tilde{m}_4) \cdot \tilde{m}_3} m_2 - m_1$$

and $$n_3 = \frac{(\tilde{m}_1 \times \tilde{m}_4) \cdot \tilde{m}_2}{(\tilde{m}_2 \times \tilde{m}_4) \cdot \tilde{m}_2} \tilde{m}_3 - \tilde{m}_1.$$

* * * * *